United States Patent [19]

Palmen

[11] Patent Number: 5,549,230
[45] Date of Patent: Aug. 27, 1996

[54] LUGGAGE CARRIER FOR MOTORCARS

[76] Inventor: Isedore D. M. H. Palmen, Slakkehuis 1 - 6585 XA, Mook, Netherlands

[21] Appl. No.: 446,017

[22] Filed: May 19, 1995

Related U.S. Application Data

[63] Continuation of Ser. No. 84,238, Jun. 24, 1993, abandoned.

[30] Foreign Application Priority Data

Dec. 27, 1990 [NL] Netherlands ............................ 9002874

[51] Int. Cl.$^6$ .................................................. B60R 9/06
[52] U.S. Cl. .......................................... 224/520; 224/511
[58] Field of Search ..................... 224/42.03 R, 42.45 R, 224/511, 520

[56] References Cited

U.S. PATENT DOCUMENTS 4,412,635  11/1983  Bateman ........................... 224/42.03 R

FOREIGN PATENT DOCUMENTS 13108294  9/1982  Germany.
8100211   8/1982  Netherlands ..................... 224/42.03 R
2175859  12/1986  United Kingdom.
2197273   5/1988  United Kingdom.
2195304   6/1988  United Kingdom.
2260111   4/1993  United Kingdom.

OTHER PUBLICATIONS

International Search Report for PCT/EP 91/02467 dated Mar. 30, 1992.

*Primary Examiner*—Renee S. Luebke
*Attorney, Agent, or Firm*—Rosen, Dainow & Jacobs Limited Liability Partnership

[57] ABSTRACT

Device for mounting a luggage carrier to the towing hook of a motor car, having a clamping piece mounted on the horizontal part of the towing hook. The clamping piece is provided with a coupling element which cooperate with a corresponding coupling element that is part of the luggage carrier, which can hold the vertical part of the towing hook, and can be clamped and locked on the ball of the towing hook.

5 Claims, 5 Drawing Sheets

LUGGAGE CARRIER FOR MOTORCARS

This application is a continuation of application Ser. No. 08/084,238, filed Jun. 24, 1993, now abandoned.

The invention concerns a device for mounting a luggage carrier upon the towing hook of a motorcar, having a clamping piece that can be secured upon the horizontal part of the towing hook, provided with a part with guiding means, standing out in backward direction which may cooperate with parts of the luggage carrier in such a way that the luggage carrier can move perpendicular to the towing hook, the movement being limited in downward direction because a part of the luggage carrier is stopped by the ball of the towing hook.

A device is known for mounting a bicycle carrier upon the towing hook of a motorcar. A well known embodiment of such a device consists of two parts: firstly a clamping piece that is mounted upon the horizontal part of the towing hook by means of clamping straps and having attached thereto a part to which the carrier is mounted—and secondly another part which is solidly connected to the carrier and by which the carrier is connected to the holding element of the clamping piece and thus to the towing hook of the car. The holding element then has guiding means that allow the luggage carrier, when being mounted, to glide downward along these means until it is stopped. This stopping happens when the ball of the towing hook bounces against a solid part of the carrier. The guiding means can for example be: two tubular parts that are open on the top side and in which a part of the luggage carrier can be fitted with two pins.

In such known constructions the luggage carrier is fixed in its final position by means of, for example, a bolt that is screwed from the outside through a wall of the part of the luggage carrier of the towing hook which lies behind it. The carrier is thus clamped upon the towing hook. The mentioned guiding system makes that the carrier can not, or at least can not easily, move sidewards.

The known fastening constructions have several disadvantages. An important disadvantage for example is that the luggage carrier easily starts to rattle on the towing hook and/or at the vertical guiding means. This not only produces an annoying sound, but it also easily leads to vibrating loose the bolt with which the luggage carrier is attached to the towing hook.

Another disadvantage is that the luggage carrier can relatively easily can come loose from the ball of the towing hook. This of course is disadvantageous in relation to traffic safety and in some countries the aforementioned construction did not receive the official, required safety certificate and consequently could not be brought onto the market.

The invention concerns a construction that does not have the above mentioned disadvantages. To that end the device is characterised in that the part of the luggage carrier which is equipped with means that cooperate with the guiding means, has a vertical gutter-shaped indentation which can hold the vertical part of the towing hook and the ball and has on its upper side a mechanism with which it can be clamped upon the ball, in which situation it can be locked.

Essential for the device is the improved attachment of the luggage carrier, i.e. with the gutter-shaped indentation on the towing hook and the ball, as a result of which an unwanted sideward movement is prevented to a large extent, and the safety lock. In this construction the luggage carrier can not loosen, which enhances its safety and with the mentioned connection, the chance that the luggage carrier will rattle is drastically reduced.

According to an embodiment of a device according to the invention, the indicated improved attachment of the luggage carrier on the ball is realized by a clamping mechanism with which the carrier part is mounted upon the ball, comprising a shell-shaped part which—in clamped position—clamps around a part of the ball. In this position the ball is 'firmly grasped' over a part of its surface. This 'grasping' can be realized by a mechanism that is automatically activated when the mentioned part of the luggage carrier is placed upon the towing hook, resulting in a strong interlocking.

In a preferred embodiment of a device according to the invention, there is a clamping mechanism with a body that contains a tiltable, shell-shaped part with which a spring cooperates in such a manner, that when the ball of the towing hook lies against the upper limitation of the gutter-shaped indentation, the shell-shaped part is clamped against the ball by means of the spring force. It also is equipped with a handle, rotatable around an axis, which is parallel to, or coinciding with the tilting axis of the shell-shaped part, which cooperates with the spring such, that if it is activated, the spring force no longer acts upon the shell-shaped part and it consequently becomes freely tiltable. In tilted-aside position the luggage carrier then can be placed upon the ball of the towing hook.

When the carrier is mounted upon the towing hook, the handle, which, when not used, is in vertical position and which hinges on its far end, is pulled. With the handle, the spring, which is prestressed and in resting position both locks the handle in its vertical position and the shell-shaped part in its clamped position, is prestressed additionally. The spring is connected to the shell-shaped part in such a way that when the spring is pulled, the spring force no longer acts on the shell-shaped part, which therefore becomes fresly movable, which in this case means, that it becomes tiltable. When the shell-shaped part is tilted, a space comes free for the ball of the towing hook, which when the luggage carrier is brought in position, comes to rest against a stopping shoulder on the luggage carrier. When then the handle is released, the spring force will insure that the shell-shaped part will clamp around the ball of the towing hook and that the handle will take its vertical position again.

Preferably the device according to the invention is constructed in such a manner that it comprises a handle which on the sides has protrusions moving in slotted holes in the side sides of the luggage carrier part, cooperating with holes in the walls of the body, so that if the handle is activated, the body and with the body, the shell-shaped part, turns. When the handle is pulled via those indentations, the body is tilted and the shell-shaped part 'comes free' to let the ball of the towing hook through.

A further preferred embodiment of the device according to the invention, is the one in which the handle has a protrusion over its turning axis, which sticks out through an opening in the upper wall of the housing when that shoulder is pushed against the upper wall of the housing and further showing a shoulder, extending under that upper wall, which when that shoulder is pushed against the upper wall of the housing, makes it impossible to easily turn the handle—and with that to easily unlock the coupling. This embodiment makes the coupling between the towing and the carrier very safe and extra secure. When, for example, the spring would give away, or when a sudden force would act on the handle in backward direction, this will not easily to an unlocking of the ball of the towing hook since the handle lies with the shoulder against the upper wall of the housing. The clamping mechanism automatically falls into that locked position as soon as the luggage carrier is clamped upon the towing hook.

The invention will be further explained on the basis of the drawing which schematically represents an embodiment of a device according to the invention. In this drawing.

Figure 1:
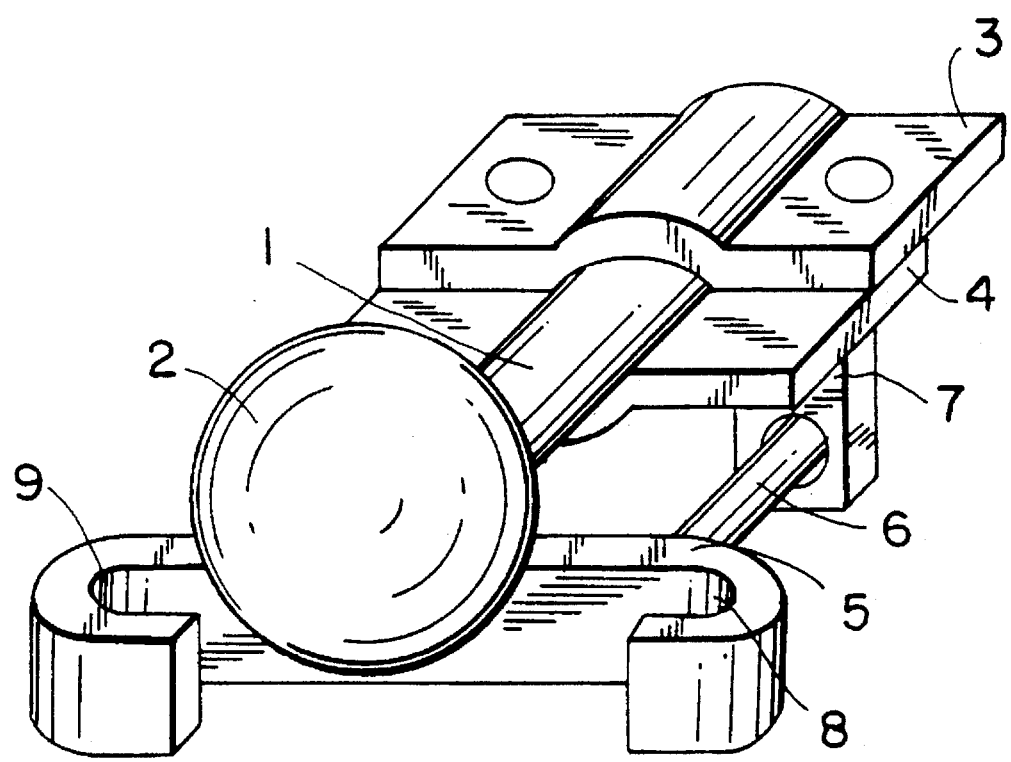
FIG. 1 represents, in perspective, the clamping piece that is mounted upon the towing hook.

In FIG. 1, 1 represents the towing hook and 2 the ball of the towing hook. The clamping piece is clamped upon the horizontal part of the towing hook by means of the clamping brackets 3 and 4. Part 5 of the clamping piece, which is connected to the clamping brackets 3 and 4 by means of the bolts 6 and the cross strap 7, sticks out from under the towing hook 1. It is provided with guiding means 8 and 9. Parts 10 and 11 (shown in FIG. 2) cooperate with those guiding means 8 and 9.

Figure 2:
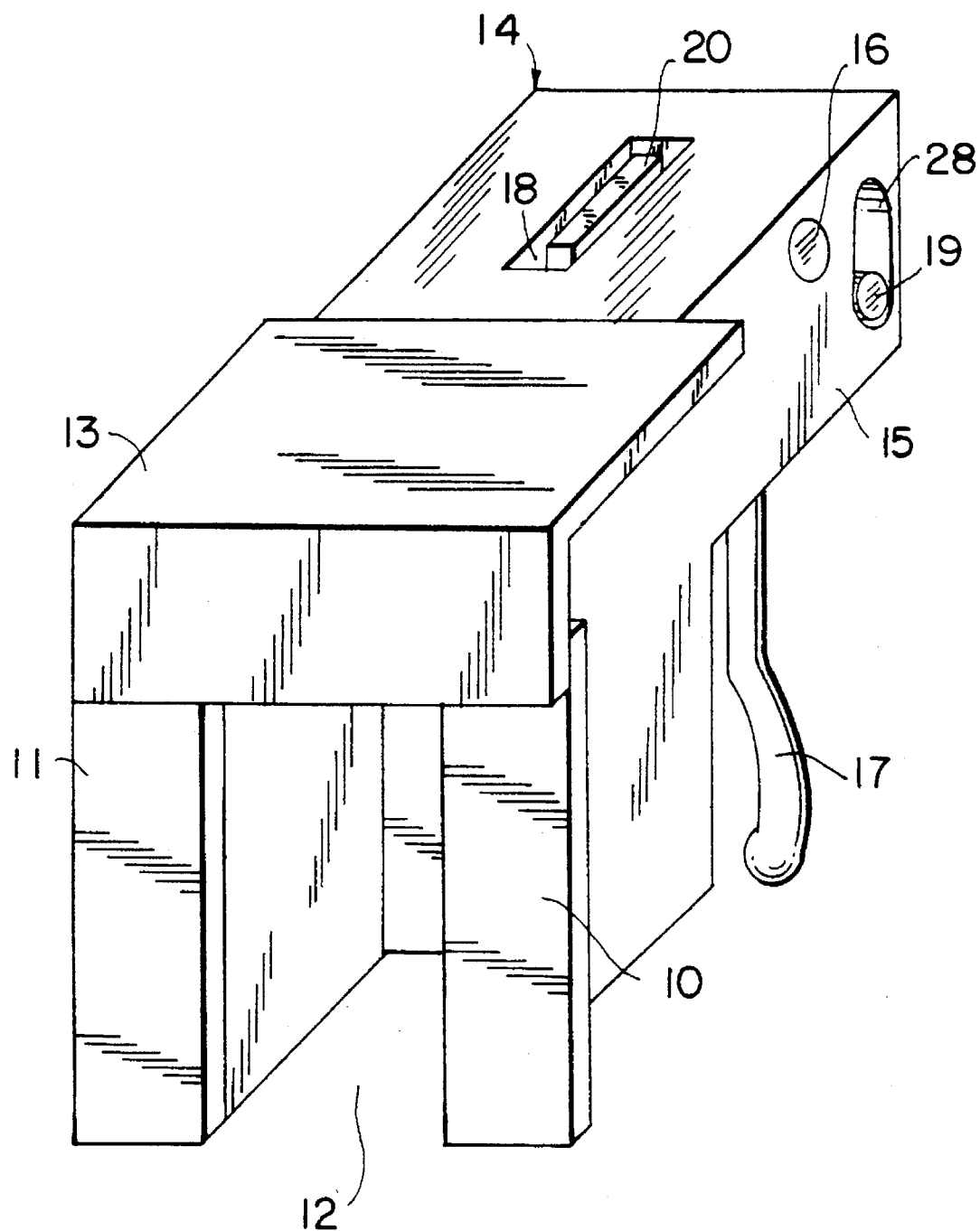
FIG. 2 shows, also in perspective, the part of the luggage carrier with which it is connected to the clamping piece

In the part of the luggage carrier that is shown in FIG. 2, 12 is the gutter-shaped indentation which, when the part with the guiding means 10 and 11 is pushed into the guiding means 8 and 9, holds the upright part of the towing hook 1 and the ball 2. The ball 2 will stop at the underside against the upper wall 13 of that indentation 12. When thus constructed, the sideward movement of the carrier part in relation to the clamping piece is drastically prevented.

In FIG. 2, 14 is a housing in which in the wide walls 15 a axis 16 is mounted with bearings, around which in the shown embodiment both the handle 17 and the shell-shaped part 22 (see FIG. 3) rotate. 28 is a slotted hole in which the protrusions 19, which are situated on both the sides of the handle 17, and form one unit therewith, may slide to and fro. When the protrusions 19 are in the upper parts of the slotted holes 28, the upper part 20 of the handle 17 will stick out through the groove-shaped opening 18 in the upper wall of the housing and in that situation a shoulder 27 under/on the side of the upper part 20 (see FIG. 3) will cause an extra lock. In the housing 14 the body 21 with the shell-shaped part 22 and the spring 23 are situated (see FIG. 3).

Figure 3:
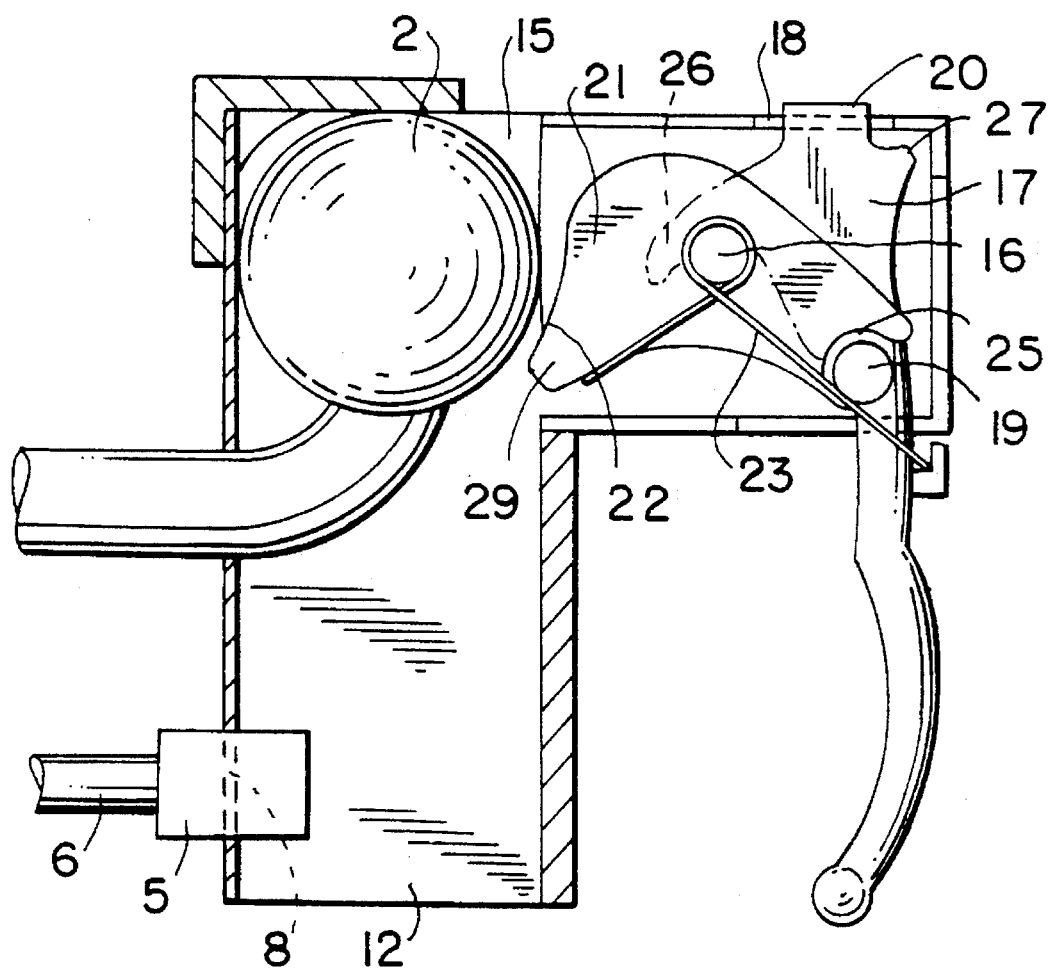
FIG. 3 shows by a cut-away side view in the part how, shown in FIG. 2, the clamping mechanism works.
Figure 4:
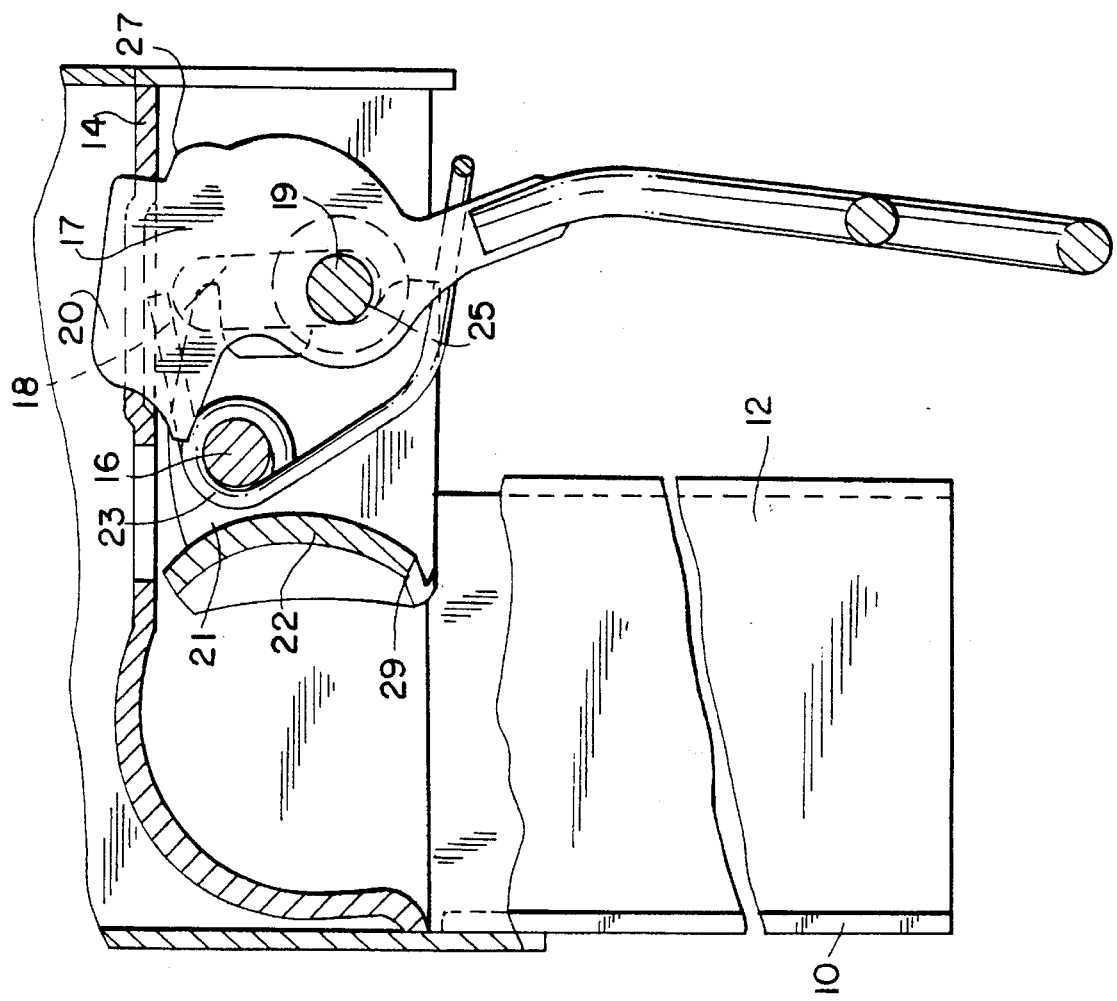
FIG. 4 shows, by a cut-away side view, of an embodiment of the invention in a "clamped" position.
Figure 5:
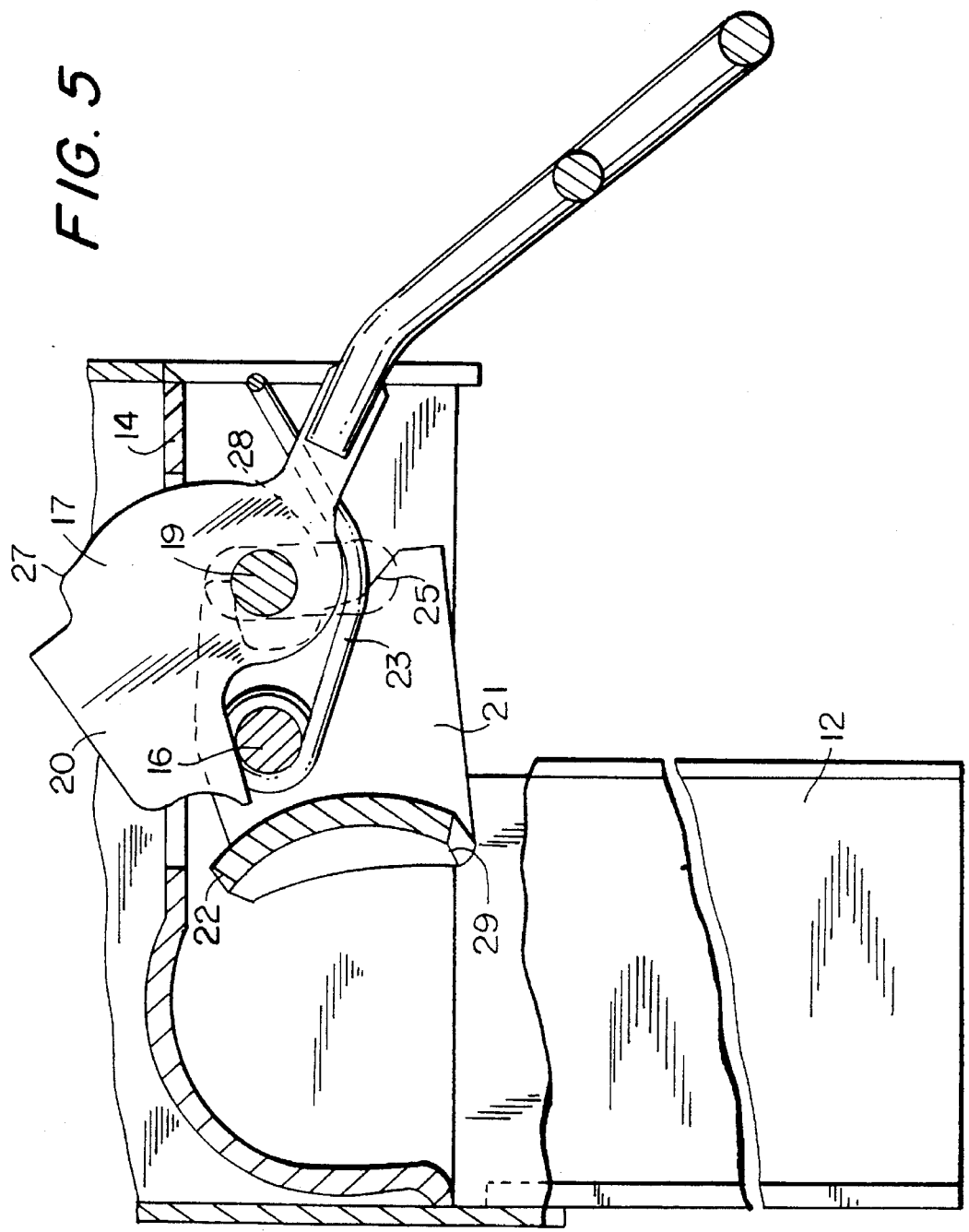
FIG. 5 shows, by a cut-away side view, of an embodiment of the invention in an "unclamped" position.

FIG. 3 shows a cut-away side view of the part of the luggage carrier drawn in FIG. 2. The gutter-shaped part 12 is pushed along the ball of the towing hook in which situation the strap 10 shoves into the guiding means 8. The guiding means 8 and 9 (the latter is not drawn) are part of the part 5, which is connected to the horizontal part of the towing hook by means of the bolts 6 and the clamping piece (not drawn).

A spring 23 is connected around the axis 16 with one end and around the handle 17 with the other end. This spring 23 in its resting position is extended and is pulled even further when the handle 17 is moved to the right. When after the rightward movement the handle is released, it will be pulled back into its vertical position as a result of the spring force, until the shell-shaped part 22 will stop against the surface of the ball 2 of the towing hook. The ball 2 can only be unlocked by moving the handle 17 to the right.

To avoid that the locked connection between the luggage carrier and the ball 2 nevertheless is unlocked, for example because the spring gives away or because the handle 17 is accidently moved to the right, the handle 17 on its upper side has a part 20 with which it sticks out through an opening in the upper side of the housing 14. The handle also has a shoulder 27. When the handle 17 is moved to the right, it will have very limited space for movement. That space for movement is very limited by the shoulder 27, which stops against the innerside of the upper wall, thus considerably enchances the safety of the coupling.

I claim:

1. A device for mounting a luggage carrier to a towing hook fixedly attached to a motor car, said towing hook having a horizontal part terminating at a first end affixable to said motor vehicle, and a second end extending vertically from the horizontal part terminating at a ball head, said device comprising:

a clamping piece demountably mounted upon a part of the horizontal part of said towing hook which clamping piece includes;
  a clamping means for attaching the clamping piece to the horizontal part of the towing hook, and,
  guiding means positioned relative to the ball head, and,
a luggage carrier part which includes;
  a gutter shaped indentation adapted to receive the ball head of the towing hook therein wherein the gutter shaped indentation further includes guiding means which cooperatively engage the guiding means of the clamping piece,
  a handle moveable about an axis,
  a moveable body having a shell shaped part adapted to contact a portion of the ball head within the gutter shaped indentation and further having an indentation adapted to contact a portion of the handle,
  wherein the handle when moved about the axis is operable to retract the shell shaped part of the moveable body within the interior of the gutter shaped indentation so to remove the contact between the ball head and the shell shaped part of the moveable body and thereby permit the disengagement between the towing hook with affixed clamping means and the luggage carrier part.

2. The device according to claim 1 wherein the luggage carrier part further includes:

a spring which is biased to move the handle in a direction to urge the shell shaped part of the moveable body to extend within the interior of the gutter shaped indention.

3. The device according to claim 1 wherein the luggage carrier part further includes:

a housing extending from a side of the gutter shaped indentation, said housing having an upper part, and two side walls for containing therein at least a portion of the handle, and at least a portion of the moveable body.

4. The device according to claim 3 wherein:

the upper part of said housing includes a grooved shaped opening, and,
the handle further includes an upper part dimensioned to allow passage through the grooved shaped opening when the handle is moved about its axis to retract the shell shaped part of the moveable body from the interior of the gutter shaped indentation.

5. The device according to claim 4 wherein:

the handle further includes a shoulder adjacent to the upper part wherein the shoulder is dimensioned so to contact the upper part of the housing when the handle is moved.

* * * * *